United States Patent Office 2,704,975
Patented Mar. 29, 1955

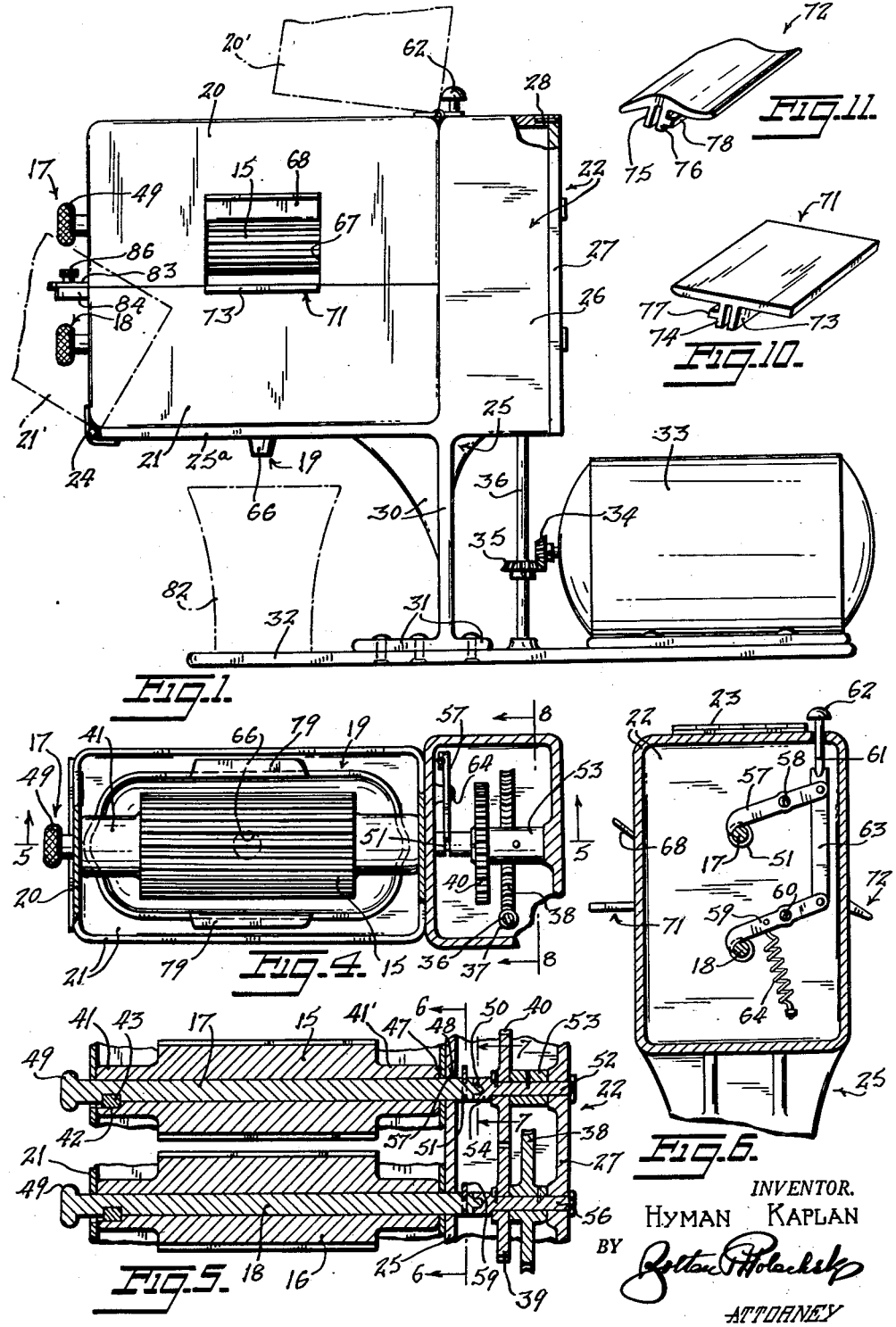

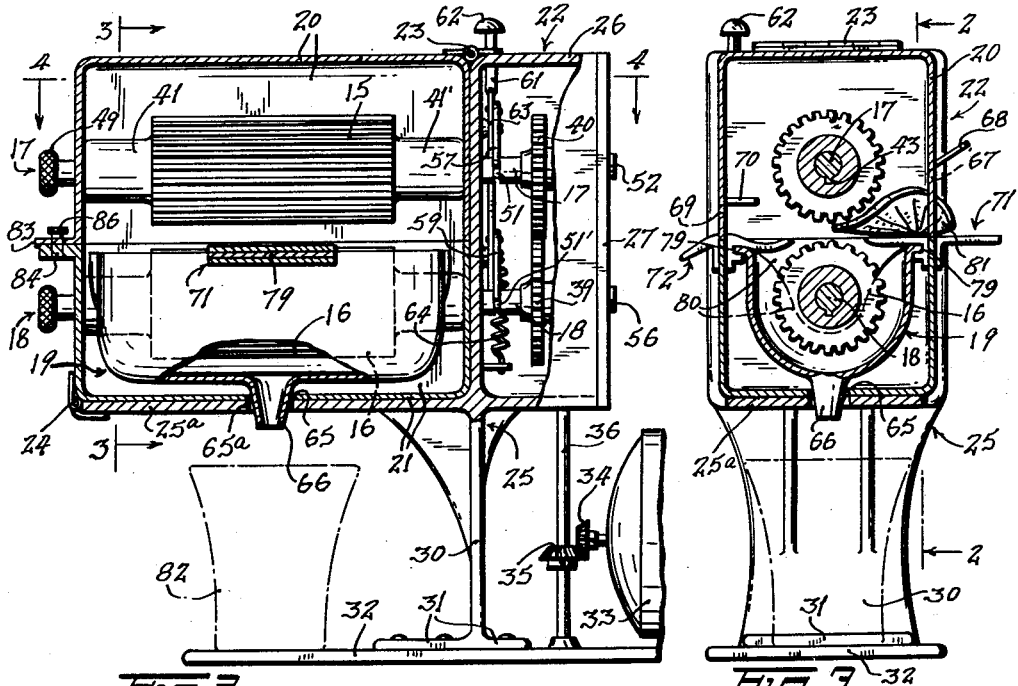

2,704,975

JUICE EXTRACTOR FOR CITRUS FRUIT

Hyman Kaplan, Brooklyn, N. Y.

Application August 29, 1950, Serial No. 182,009

13 Claims. (Cl. 100—121)

This invention relates to new and useful improvements in juice extractors for squeezing the juice from citrus fruits such as lemons, grapefruit, limes and oranges; and, more particularly, the aim is to provide a novel and valuable juice extractor in which there is used a power drive, as one involving the inclusion of a small electric motor, and in which this drive is employed for simultaneously rotating in opposite directions each of a pair of upper and lower longitudinally corrugated, fluted or ribbed drums between which a segment of the citrus fruit from which the juice is to be squeezed is fed. During continued rotation of said drums, one such segment after another may be fed into the apparatus, for moving one after another along a path passing between the drums. To simplify the description, from here on the invention will be explained in connection with the squeezing of oranges.

A further feature of the invention is that, with an apparatus as just described, and with the drums in a casing to be maintained closed during operation of the apparatus, both drums may nevertheless be readily wholly removed from the apparatus for washing and cleaning.

Another feature of the invention is that, with an apparatus as above, and further, with one incorporating a cup of funnel-like type so placed below the lower drum as to collect the extracted orange juice and guide the latter for discharge from a spout depending from and forming part of said cup, said cup may also be readily wholly removed from the apparatus for washing and cleaning.

Among the objects of the invention are, not only to provide an orange juicer apparatus as aforesaid, but also to provide an apparatus wherein a juice collecting cup is present which is so shaped and disposed that all juice dropped from said drums and particularly from the lower drum must drop into the cup and in a way to preclude any chance of any of said juice escaping from the cup by leak at the shaft mounting said lower drum; further, to provide an apparatus wherein, preparatory to any removal of the drums and cup as aforesaid, said casing may be quickly opened up, to permit said removal; further, to provide an apparatus wherein, preparatory to said opening up of said casing, mounting shafts for the drums may be quickly removed, by manipulations wholly performed from the exterior of the apparatus, thereby to permit said opening up of the casing; further, to provide an apparatus wherein a gear train for transmitting a power drive to each of said shafts is in a housing separate from said casing; and further, to provide an apparatus so constituted that, after removal of said shafts, said drums and said cup, and when thereafter, as after washing and cleaning said drums and said cup, it is desired to restore the apparatus to its normal operative assembly, this restoration may be accomplished easily and quickly and by a series of simple operations all performed without opening up the housing which contains said gear train.

Various other objects, features and advantages will be expressly pointed out or become apparent hereinafter.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 side elevationally shows a now favored embodiment.

Fig. 2 is partially a longitudinal vertical section taken substantially on the line 2—2 of Fig. 3 and partially a side elevation as in Fig. 1.

Fig. 3 is a transverse vertical section taken substantially on the line 3—3 of Fig. 2.

Fig. 4 is a horizontal section taken substantially on the line 4—4 of Fig. 2, but with only said upper casing section shown, fragmentarily, at each of the two ends of said upper section.

Fig. 5 is a fragmentary detail view, this being a vertical section taken on the line 5—5 of Fig. 4.

Fig. 6 is a transverse vertical section, taken at the plane of and as indicated by the line 6—6 of Fig. 5.

Fig. 7 is a fragmentary detail view, this being a very greatly enlarged vertical section taken on the line 7—7 of Fig. 5.

Fig. 8 is a transverse vertical section, taken on the line 8—8 of Fig. 4.

Fig. 9 is a perspective view of said upper casing section, detached, with the section partially broken away and partially in section.

Fig. 10 is a perspective view of a feed-in shelf-fixture carried by said lower casing section, at the side thereof seen in Fig. 1.

Fig. 11 is a perspective view of a feed-off shelf-fixture carried by said lower casing section, at the side thereof opposite to that seen in Fig. 1.

Fig. 12 is a perspective view of the juice collecting cup, per se.

The juice extractor, according to the present invention, includes an upper drum 15 and a lower drum 16 mounted respectively on shafts 17 and 18. A juice collecting cup 19 is positioned about the lower drum 16.

The drums and the cup are normally in a compartment established when the casing sections 20 and 21 are disposed, as shown in full lines, relative to a housing 22 for containing the aforesaid gear train and other means to be described later; the upper casing section 20 being hinged to the housing 22 as at 23, and the lower casing section 21 being hinged to a platform extension 25a from said housing 22 as at 24.

As these casing sections 20 and 21 are shown in broken lines in Fig. 1, respectively at 20' and 21', they have been swung to open up said compartment.

The platform extension 25a is a part of and arranged at a suitable elevation on a main casting 25; which includes the box portion 26 of the gear-train housing 22. The housing is permanently closed by a cover plate 27 as by the use of a suitable number of securing means indicated at 28 in Fig. 1.

The casting 25 further incorporates a supporting leg 30 terminating in a foot portion 31 secured as by rivets to a main base plate 32.

Suitably attached to said plate 32 is an electric motor 33, on the shaft of which is fixed a bevel pinion 34 meshing with a bevel pinion 35 fixed on a vertical shaft 36 extending upwardly into the housing 22 and there fixedly carrying a worm 37 meshing with a worm gear 38. This worm gear is coaxial with and arranged for rotation with a spur gear 39 meshing with a like spur gear 40. These gears 39 and 40 are for imparting power drives, in a manner to become clear later, to the drums 16 and 15, respectively.

Said drum 15 and certain arrangements provided in connection therewith will now be explained; it being pointed out that the drum 16 is equivalently constructed and provided with equivalent arrangements.

At opposite ends the drum 15 has rather long hub portions 41 and 41', and there is a central bore through said drum from end to end thereof, this for receiving the main cylindrical portion of the shaft 17 when endwisely advanced toward the right in Fig. 5. As shown in Figs. 3 and 5, said shaft carries a suitably anchored key 43 to hold the drum for rotation with the shaft, by a keyway 42 in the hub 41.

To permit mounting of the shaft 17 and the drum 15 as shown in Figs. 2–5, there is an aperture 45, see Fig. 9, through one end wall of the upper casing section 20, this aperture being enlarged at 46 for passage therethrough of the key 43. Aligned with said aperture 45 there is a circular aperture 47 through the opposite end wall of said section 20, the last-named aperture registering with a like aperture 48, see Fig. 5, through the adjacent wall of the gear train housing 22 included in the main casting 25.

At one end of the shaft 17 is a knurled knob 49 (Figs. 1–5), and at the opposite end of said shaft is a reduced portion 50 of star cross-section (Figs. 5 and 7). The shaft 17, adjacent to its said portion 50, has an annular groove 51 (Figs. 5, 6 and 7).

In the housing 22 is a gear-train upper shaft 52, this having fixed thereon the spur gear 40 and also a collar 53 (Figs. 4 and 5). Said shaft 52 has an enlarged end 54 remote from said collar (see also Fig. 7), shaped to present a recess 55 of star cross-section for positive clutch reception of the reduced portion 50 of the shaft 17. For similar operative coupling with the shaft 18 for the lower drum 16, there is also in the housing 22 a gear-train lower shaft 56, having parts exactly like the elements 54 and 55; this shaft 56 having fixed thereon the spur gear 39 and the worm gear 38.

For normal interlocking with the said annular groove 51 in shaft 17 there is provided a holding dog 57 at an end of a rock arm pivoted at 58 (Fig. 6); there being a similar dog 59 pivoted at 60 for normal interlocking with an annular groove 51' in the lower shaft 18 corresponding to the groove 51. The pivot rods or points 58 and 60 are attached to the main casting 25 above and to one side of shafts 17 and 18 respectively. A push rod 61, at its top projected above the housing 22 and there carrying a push-button 62, integrally includes a lower strip portion 63 pivotally connected with and constituting a coupling link for the dogs 57 and 59. A retractile spring 64 acts as shown in Fig. 6 to hold the two dogs in their said grooves.

As will be noted particularly from Figs. 2 and 3, the lower casing section 21 (which is closed at both ends except for apertures corresponding to the apertures 45—46 and 47 in the end walls of the upper casing section 20; said apertures in the end walls of the section 21 being for the lower drum shaft 18), has a closed bottom except for an aperture 65 for matching an aperture 65ª through the platform extension 25ª to permit downward protrusion of the bottom spout 66 of the cup 19. As will be noted particularly from Fig. 4, said lower casing section 21 has its side walls, which are as high as its end walls, uninterrupted by any openings.

The upper casing section 20, however (see Figs. 1, 3 and 9), has its near side wall in Fig. 1 interrupted by a rectangular opening 67 outwardly eaved over by a struck-out portion 68 of the sheet material of which said casing section is made; and said section 20 has its opposite side wall interrupted by a rectangular opening 69 (Figs. 3 and 9) inwardly eaved over by a struck-in portion 70 of said sheet material.

The feed-in shelf-fixture, 71, of Fig. 10, is straddlingly wedgedly frictionally attached to the front side wall of the lower casing section 21, for dispostion below the orange-segment feed-in opening 67, when the casing 20—21 is closed as in full lines in Fig. 1. The feed-off shelf-fixture, 72, of Fig. 11, is similarly frictionally attached to the rear side wall of the lower section 21, for disposition below the peel and pulp feed-off opening 69, when the casing 20—21 is closed as in full lines in Fig. 1. It will be noted that for the said straddling attachment of the shelf-fixture 71, the latter has dependent therefrom a strip-portion bifurcated to incorporate a pair of strip-clips 73 and 74; and that for like attachment of the shelf-fixture 72, the latter also has dependent therefrom a corresponding pair of strip-clips 75 and 76.

The fixture 71 carries an integral inwardly directed ledge-rib 77 disposed on the inner portion of the strip clip 74 and the fixture 72 carries a similar inwardly directed ledge-rib 78 on the inner portion of the strip clip 75. These ledge-ribs provide the support on which the lips 79, 79 lie to support the cup in operative position (see Figs. 3, 4 and 12). These fixtures 71 and 72 may be conveniently made, for example, as die castings, or, more economically, molded from a suitable plastic.

Attention particularly is directed now to the shaping of the cup 19, between its lips 79 and its bottom portion leading to its spout 66. Despite the presence of the shaft 18, no orange juice delivered from the drums 15 and 16 can leak from said cup anywhere, even at points adjacent to said shaft. Otherwise stated, while the problem was to have the cup 19 so disposed relative to the two drums as to constitute a 100%-efficient catch-basin for all the orange juice extracted, and so necessitating that the cup at its top must extend up well above the axis of rotation of the lower drum 16, neither the shaft 18 nor the drum 16 should pass through an aperture in the cup at a location reachable by the orange juice. This problem, it will be noted, has been solved by providing considerably prolonged hub portions (as the hub portions 41 and 41' of the upper drum 15) for each of the two drums, and by correspondingly lengthening the side walls of the cup and giving steeply dipped-down recesses 80, 80 (Figs. 3 and 12) to the tops of the end walls of the cup, all as perhaps best shown in Fig. 12.

At 81 in Fig. 3 is indicated a segment of an orange, in course of passing from the feed-in shelf-fixture 71 for entry into engagement with the drums 15 and 16 for passage therethrough, and thence for discharge of its peel and pulp to the shelf-fixture 72 for drop therefrom, with the extracted juice spilling into the cup 19 for delivery to a suitable receptacle, as the drinking glass indicated at 82.

As a convenient means for locking together the two casing sections 20 and 21 to establish the compartment wherein there is contained the cup 19 and there are operatively assembled the two drums 15 and 16 as already described, the upper section 20 is shown as having extended therefrom an ear 83 (Figs. 1 and 2) while suitably attached to the lower section 21 is a block 84; said ear having an aperture 85 (Fig. 9), and said block being drilled and tapped, so that when the threaded shank of a screw 86 is passed down through said aperture and engaged with the internal thread tapped into said block, full tightening of the screw effects the desired locking of the two casing sections 20 and 21 together.

To open up the casing 20—21 for removal of the drums 15 and 16 and/or the cup 19, for washing and cleaning, the procedure is as follows:

First, the push-button 62 is depressed to raise the dogs 57 and 59 out of the annular grooves in which they normally rest as in Fig. 6, and then the knob 49 of the shaft 17 and the corresponding knob of the shaft 18, are pulled to break connection of the shaft 17 with the gear-train upper shaft 52 at the elements 50 and 55 and similarly to break connection of the shaft 18 with the gear-train lower shaft 56.

Next, the shaft 17 is wholly withdrawn, then the screw 86 is loosened and removed, and the upper casing section 20 carefully raised toward its broken line position 20' while manually reaching in and grasping for removal the upper drum 15.

Next, the two fixtures 71 and 72 are temporarily detached from the side walls of the casing section 21.

Next, the shaft 18 is wholly withdrawn, and then the lower casing section 21 is swung over and toward inverted position as indicated at 21', thus allowing the drum 16 first to drop for manual seizure and removal and the cup 19 next to drop for manual grasp and removal.

After return of the lower casing section 21 to its full line position in Fig. 1 and the two drums and the cup have been washed and cleaned, the parts are reassembled, first by replacing the said fixtures 71 and 72, and concurrently, with the drum 16 lying at its hubs in the cradles established by the curvatures 80, 80 of the cup 19, hanging said cup in place at its lips 79 on the ledge-ribs 77 and 78 of the fixtures 71 and 72; and then proceeding as follows:

With the drum 16 manually lifted slightly in the lower casing section 21, the shaft 18 is inserted through the aperture (corresponding to the aperture 45—46 of Fig. 9) of the said section 21, and thence into the bore of said drum 16 until the key on said shaft 18 (corresponding to the key 43, Fig. 5, of the shaft 17) enters its keyway (corresponding to the keyway 44 in the hub 41 of the drum 15) in the hub of the drum 16 corresponding to said hub 41.

This mating of key and keyway, for locking the drum 16 for rotation with its shaft 18, is effected when, following passage of the shaft 18 also through the apertures (corresponding to the apertures 47 and 48, Fig. 5, respectively through the casing section 20 and the adjacent wall portion of the main casting 25) through the casing section 21 and said wall portion of said casting 25, the shaft 18 is clutched at the part thereof corresponding to the star element 50, Fig. 7, of the shaft 17 with the part of the gear-train lower shaft 56 corresponding to the star recess 55 of the gear-train upper shaft 52.

In order that such clutch may be established by inward endwise movement of the shaft 18, the push-button 62 is held depressed for the duration required, to clear the dogs 57 and 59 out of the way; the said button being released the instant the clutch is established, thereby to cause dropping of said dogs to cause entry of the lower dog 59 into the annular groove on the shaft 18 corresponding to the groove 51, Fig. 6, on the shaft 17.

If a slight rotation of the shaft 18 is required for easy entry of the star element at the inner end thereof into its clutch-complementary star recess of the gear-train lower shaft 56, this rotation may be effected by aid of the knurled knob of the shaft 18 corresponding to the knob 49.

Next, with the upper casing section 20 disposed as at 20' in Fig. 1, and with the drum 15 held manually in said section, the shaft 17 is inserted through the aperture 45—46 (Fig. 9) of said section, and thence well into the bore 42 (Fig. 5) of said drum. Then, said casing section 20 having been lowered to its full-line position in Fig. 1, the shaft 17 is further endwisely advanced until the key 43 on said shaft enters its keyway 44 in the hub 41 of said drum. The mating of said key and keyway, for locking the drum 15 for rotation with its shaft 17, is effected when, following passage of the shaft 17 also through the apertures 47 and 48 (Fig. 5), the shaft 17 is clutched at its star element 50 (Fig. 7) with the star recess 55 of the gear-train upper shaft 52. As and for the purpose stated in describing the reassembly of the lower drum 16 and its shaft 18, the push-button 62 is depressed and held depressed until perhaps aided by slight rotation of the shaft 17 effected manually at the knob 49, the clutch 50—55 is established; whereupon, on now for the second time releasing said button 62, the dog 57 (Fig. 6) drops into the annular groove 51 of the shaft 17, concurrently with re-drop of the dog 59 into the annular groove of the shaft 18 corresponding to said groove 51.

Finally, the screw 86, Figs. 1 and 2, is reapplied as there shown and as already explained to lock together the two casing sections 20 and 21.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a machine for extracting juice from citrus fruit, a superimposed pair of drums between which a segment of the fruit is to be passed for juice extraction therefrom, a casing for enclosing said drums, a cup in said casing below the drums in position for having spilled therein the extracted juice, a mounting means for each drum including a shaft for rotation with that drum, power means for rotating said shafts in opposite directions, said casing including two relatively movable parts one of which is an upper shell-like section supporting one of said shafts and the other of which is a lower shell-like section supporting the other of said shafts, said lower section having an opening at its bottom, said cup at its bottom having a dependent spout for protrusion through said opening, said upper section at one side having a fruit segment feed-in opening and at its other side having a peel and pulp feed-out opening, there being at each of the two sides of said lower section a shelf-fixture frictionally straddlingly affixed thereto with one of said fixtures below said feed-in opening and the other of said fixtures below said feed-out opening.

2. In a machine for extracting juice from citrus fruit, a superimposed pair of drums between which a segment of the fruit is to be passed for juice extraction therefrom, a casing for enclosing said drums, a cup in said casing below the drums in position for having spilled therein the extracted juice, a mounting means for each drum including a shaft for rotation with that drum, power means for rotating said shafts in opposite directions, said casing including two relatively movable parts one of which is an upper shell-like section supporting one of said shafts and the other of which is a lower shell-like section supporting the other of said shafts, said lower section having an opening at its bottom, said cup at its bottom having a dependent spout for protrusion through said opening, said upper section at one side having a fruit segment feed-in opening and at its other side having a peel and pulp feed-out opening, there being at each of the two sides of said lower section a shelf-fixture frictionally straddlingly affixed thereto with one of said fixtures below said feed-in opening and the other of said fixtures below said feed-out opening, and a mounting means for said cup including projections on said fixtures and a pair of lips one offset from each side of said cup near the top thereof.

3. In a machine for extracting juice from citrus fruit, a superimposed pair of drums between which a segment of the fruit is to be passed for juice extraction therefrom, a casing for enclosing said drums, a cup in said casing below the drums in position for having spilled therein the extracted juice, a mounting means for each drum including a shaft for rotation with that drum, power means for rotating said shafts in opposite directions, said casing including two relatively movable parts one of which is an upper shell-like section supporting one of said shafts and the other of which is a lower shell-like section supporting the other of said shafts, said lower section having an opening at its bottom, said cup at its bottom having a dependent spout for protrusion through said opening, said upper section at one side having a fruit segment feed-in opening and at its other side having a peel and pulp feed-out opening, there being at each of the two sides of said lower section a shelf-fixture frictionally straddlingly affixed thereto with one of said fixtures below said feed-out opening, and a mounting means for said cup including projections on said fixtures, said cup being provided with a pair of laterally directed lips, offset from each side of the said cup near the top thereof, adapted to be engaged on said projections, said cup being shaped to have sufficiently lowered end portions to have the tops thereof out of contact both with the lower drum and its shaft, said cup at each of its opposite sides being so extended relative to the working length of said drums that juice dropping therefrom must drop into the cup for spill away from the lower drum and its shaft.

4. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts axially mounted in said tubular drums and said apertures to extend at one of their ends into said housing in end alignment with said stud shafts, means keying said drums to said elongated shafts to rotate with said elongated shafts, and means including releasably pivoted dogs interconnecting the adjacent ends of said stud shafts and said elongated shafts to cause said elongated shafts and said drums to be rotated when said stud shafts are rotated.

5. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts inserted axially through said tubular drums and said apertures to extend at one of their ends into said housing in end alignment with said stud shafts, means keying said drums to said elongated shafts to rotate with said elongated shafts, and means including releasably pivoted dogs interconnecting the adjacent ends of said stud shafts and said elongated shafts to cause said elongated shafts and said drums to be rotated when said stud shafts are rotated, said elongated shafts having their other ends extended from the ends of said casing sections remote from said housing, and enlarged knobs on the said other ends of said elongated shafts by which they can be pulled axially out of said tubular drums and said casing sections.

6. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts inserted axially through said tubular drums and said apertures to extend at one of their ends into said housing in end alignment with said stud shafts, means keying said drums to said elongated shafts to rotate with said elongated shafts, and means including releasably pivoted dogs interconnecting the adjacent ends of said stud shafts and said elongated shafts to cause said elongated shafts and said drums to be rotated when said stud shafts are rotated, said keying means comprising keys extended laterally from the ends of elongated shafts remote from said housing, said tubular drums having keyways into which said keys extend.

7. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts inserted axially through said tubular drums and said apertures to extend at one of their ends into said housing in end alignment with said stud shafts, means keying said drums to said elongated shafts to rotate with said elongated shafts, and means including releasably pivoted dogs interconnecting the adjacent ends of said stud shafts and said elongated shafts to cause said elongated shafts and said drums to be rotated when said stud shafts are rotated, and manually releasable means within said housing engaging the said ends of said dogs holding them against longitudinal movement to maintain said interconnection between said stud shafts and said elongated shafts.

8. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts inserted axially through said tubular drums and said apertures to extend at one of their ends into said housing in end alignment with said stud shafts, means keying said drums to said elongated shafts to rotate with said elongated shafts, and means interconnecting the adjacent ends of said stud shafts and said elongated shafts to cause said elongated shafts and said drums to be rotated when said stud shafts are rotated, said elongated shafts, adjacent their ends, being provided with circumferential grooves in which pivotally mounted spring urged dogs are adapted to be engaged to hold said elongated shafts against axial movement and to maintain said interconnecting means in engagement therewith.

9. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts inserted axially through said tubular drums and said apertures to extend at one of their ends into said housing in end alignment with said stud shafts, means keying said drums to said elongated shafts to rotate with said elongated shafts, and means interconnecting the adjacent ends of said stud shafts and said elongated shafts to cause said elongated shafts and said drums to be rotated when said stud shafts are rotated, said elongated shafts adjacent their ends being provided with circumferential grooves, pivotally mounted spring urged dogs engaged in said grooves and adapted to hold said elongated shafts against axial movement and maintain said interconnecting means in engagement therewith, and means for manually pivoting said dogs to disengage them from the said grooves to permit the said elongated shafts to be pulled axially outward.

10. In a machine for extracting juice from citrus fruit, a main support including a hollow housing at one end thereof, superimposed casing sections mounted on said support and abutted at adjacent ends against said housing and having spaced end walls, vertically spaced stud shafts rotatively supported in said housing with one shaft located on the longitudinal axis of each of said casing sections, power operated means for rotating said stud shafts in unison in opposite directions, a tubular drum positioned between the end walls of each of said casing sections with its axis concentric with the axis of the respective stud shafts, said end walls of said casing sections having apertures aligned with the axes of said tubular drums, elongated shafts inserted axially through said tubular drums and said apertures to extend at one of their ends into said housing in end alignment with said stud shafts, means keying said drums to said elongated shafts to rotate with said elongated shafts, and means including releasably pivoted dogs interconnecting the adjacent ends of said stud shafts and said elongated shafts to cause said elongated shafts and said drums to be rotated when said stud shafts are rotated, said interconnecting means comprising end aligned reduced portions of irregular cross-section extended from the ends of said elongated shafts, the adjacent ends of said stud shafts having recesses of irregular cross-sectional shape corresponding to the cross-sectional shape of said reduced portions and into which said reduced portions are fitted.

11. In a juice extracting machine, a casing including a bottom outlet, a pair of superimposed rollers housed in said casing, a juice cup having opposed end walls with recesses of great curvature to accommodate prolonged hub portions of the lower of said rollers, means mounting said juice cup in the lower portion of the casing, the side walls of the cup being of greater length than the end walls thereof, the form of the juice cup and its relationship to the lower roller being such as to prevent any substantial leakage of the juice, and a drain spout on said juice cup extending through said outlet.

12. The combination of claim 11 wherein the juice cup includes outwardly directed lip members in spaced relation on each side of the said cup, and shelf fixtures secured to the casing having inwardly directed ledge-ribs to provide a support on which the lips may be positioned to hold the cup in operative position in the casing.

13. The combination of claim 12 wherein said shelf fixtures each include a pair of strip-clips frictionally to engage said casing.

(References on following page)

References Cited in the file of this patent

UNITED STATES PATENTS

| Number | Name | Date |
|---|---|---|
| 584,183 | Marshall | June 8, 1897 |
| 591,131 | Guenther | Oct. 5, 1897 |
| 610,882 | Aab | Sept. 20, 1898 |
| 696,416 | Denegre | Apr. 1, 1902 |
| 1,036,027 | Thompson | Aug. 20, 1912 |
| 1,147,222 | Doma | July 20, 1915 |
| 1,493,504 | Schussler | May 13, 1924 |
| 1,868,587 | Richards | July 26, 1932 |
| 2,208,796 | Jaenichen | July 23, 1940 |
| 2,291,916 | Parish | Aug. 4, 1942 |
| 2,333,669 | Ness | Nov. 9, 1943 |
| 2,504,527 | Huebner | Apr. 18, 1950 |
| 2,515,772 | Hewlett | July 18, 1950 |

FOREIGN PATENTS

| Number | Country | Date |
|---|---|---|
| 284,959 | Germany | June 10, 1915 |